(12) United States Patent
Martiš et al.

(10) Patent No.: US 7,383,856 B2
(45) Date of Patent: Jun. 10, 2008

(54) MOTOR VEHICLE TANK WITH AIR VENTING

(75) Inventors: Josip Martiš, Gunzenhausen (DE); Jan Kürbis, Treuchtlingen (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 250 days.

(21) Appl. No.: 10/952,364

(22) Filed: Sep. 28, 2004

(65) Prior Publication Data

US 2005/0139260 A1 Jun. 30, 2005

(30) Foreign Application Priority Data

Sep. 29, 2003 (DE) ................. 103 45 627

(51) Int. Cl.
*F16R 24/04* (2006.01)
(52) U.S. Cl. ............. 137/587; 137/565.22; 137/888; 123/518
(58) Field of Classification Search ............. 137/202, 137/587, 527, 565.22, 888, 597; 123/518, 123/519, 516
See application file for complete search history.

(56) References Cited

U.S. PATENT DOCUMENTS

| | | | | |
|---|---|---|---|---|
| 4,423,746 A | * | 1/1984 | Scheurenbrand et al. | ... 137/587 |
| 4,799,509 A | * | 1/1989 | Wawra et al. | ............. 137/587 |
| 5,439,129 A | * | 8/1995 | Buechler | .................. 137/587 |
| 6,026,853 A | * | 2/2000 | Osterbrink | ............... 137/527.4 |
| 6,089,249 A | * | 7/2000 | Thibaut et al. | ............. 137/587 |
| 6,302,137 B1 | | 10/2001 | Devall | |
| 6,405,747 B1 | | 6/2002 | King et al. | |
| 6,591,866 B2 | * | 7/2003 | Distelhoff et al. | .......... 123/514 |
| 6,604,539 B1 | * | 8/2003 | Strohmayer et al. | ........ 137/587 |
| 6,609,537 B1 | * | 8/2003 | Horrer et al. | ............... 137/587 |
| 6,655,403 B2 | | 12/2003 | Mills | |
| 2003/0127134 A1 | * | 7/2003 | Mills | ........................... 137/202 |

FOREIGN PATENT DOCUMENTS

| | | |
|---|---|---|
| DE | 19727227 | 1/1998 |
| DE | 19932713 | 1/2001 |
| DE | 10060239 | 6/2002 |
| DE | 10209491 | 9/2003 |
| EP | 0943476 | 9/1999 |
| WO | WO2004/091959 | 10/2004 |

OTHER PUBLICATIONS

European Search Report, EP 04022909, dated Oct. 13, 2005 with English language translation.
English Language Abstract of EP 0943476, published Sep. 22, 1999, from www.esp@cenet.com.

(Continued)

*Primary Examiner*—Ramesh Kirshnamurthy
*Assistant Examiner*—Cloud Lee
(74) *Attorney, Agent, or Firm*—Dority & Manning, P.A.

(57) ABSTRACT

A fuel tank contains a system for the removal of air, which includes an air removal line to connect the interior of the tank with the outside ambient atmosphere, whereby this line forms a siphon, and at the deepest location of the air removal line a connection section is provided with a suction opening connected to a suction source.

7 Claims, 5 Drawing Sheets

OTHER PUBLICATIONS

English Language Abstract of DE 19932713, published Jan. 25, 2001, from www.esp@cenet.com.
English Language Abstract of DE 10209491, published Sep. 18, 2003, from www.esp@cenet.com.
English Language Abstract for DE 19727227, published Jan. 8, 1998, www.esp@cenet.com.
English Language Abstract for DE 10060239, published Jun. 6, 2002, www.esp@cenet.com.

* cited by examiner

MOTOR VEHICLE TANK WITH AIR VENTING

FIELD OF THE INVENTION

The invention concerns a fuel tank for a motor vehicle with a system for the venting of air.

BACKGROUND OF THE INVENTION

A motor vehicle tank has an air venting system, with the assistance of which, pressure compensation is achieved between the interior of the tank and the surrounding ambient atmospheric air. The pressure equalization is created, for example, when, because of operation, fuel is taken from the tank or conversely, when upon refueling, the tank is being filled. The required addition and removal of air, respectively to and from the tank, associated with filling and emptying, results in a flow of air out of or into the tank interior. This air movement is taken care of, in most situations, by one or more devices installed or built into the tanks. The devices include, conventionally, a "roll-over" ball valve or a fuel level controlling valve. Added to these can be a fuel separator and an activated carbon filter to form an interface with the outer environment. These additions are mostly placed externally to the tank.

The individual components of the air vent system are connected among themselves by an air release line system, often in the form of flexible hoses. These lines, because of the complicated tank geometries found in today's motor vehicle tanks, are often supported by bottom hose supports. During a traveling period, that is to say, during a driving time of the vehicle, it is possible that liquid fuel can accumulate in the interconnected lines. This leads, then, to certain locations, wherein the lines form a downward curved, siphon-like shape, subject to gravitational flow of residual fuel. Due to fuel accumulating in the siphon, the necessary cross-section for air movement is reduced, whereby air flow through the passage deteriorates.

As an example of this flow restriction, during a refueling operation, such a high flow-resistant pressure is generated for the air trying to escape from the tank interior that it leads to a premature shutoff at the fuel delivery nozzle, which results in an incomplete filling of the motor vehicle tank.

An expulsion of the accumulated fuel from siphons in the air vent lines is possible only when the vehicle as a whole is somewhat sloped in a specific range of inclination.

BRIEF SUMMARY OF THE INVENTION

The present invention removes liquid fuel from an air venting system of a motor vehicle tank in a simple and economical manner.

In one aspect of the invention, a fuel tank with an air venting system possesses an air removal line, which connects the interior of the fuel tank with the ambient, outside atmosphere. A siphon is formed in the air removal line, and, at the deepest level of the air removal line, a connection fitting is installed, which allows the siphon at its deepest level to communicate with a suction opening which is connected to a suction source.

Although liquid fuel in the air removal line can, generally, flow back and forth during a driving period, nevertheless, it accumulates due to the pull of gravity. For example, such an accumulation can form or increase within the siphon at the deepest location of the corresponding air removal line during a stop at a traffic signal or even during straight line travel on an even, unchanging basis.

At this very point, namely at the deepest location of the siphon, the air removal line is separated. At that location is placed a connection piece, for instance a line connector, which allows the inside cross-section of the air removal line to remain unchanged, or at least be imperceptibly reduced and which line, at its deepest location, has a suction opening. The suction opening, which is found on the under side of the air removal line, is connected to a source of suction. The fuel, which is within the air removal line is, in this way, brought down through the suction opening with the aid of the suction and thus removed from the air removal line. Subsequently, this removed liquid fuel can be returned to the fuel supply within the tank. Because, time after time, nearly all of the fuel which is found in the air removal line is moved to the suction opening, it is possible that the air removal line is nearly completely free of liquid fuel. The full inside diameter of the air removal line is available for the passage of air and flow resistance is not changed.

A somewhat complicated boring or other introduction of the suction opening into the air removal line is avoided by the presence of the above mentioned connection piece. It is fully possible, that for the air removal lines, conventional hoses can remain in continued use. A connecting piece facilitates the reconnection of the parted line, for instance via molded tapered fittings, which are encapsulated by the ends of the corresponding lines. The sealing of the suction opening is accordingly improved in regard to the suction source.

That air removal line, which is subjected to the connection of fuel in the tank can be separated, by a provided connection piece and is connected to a suction source. In this way, all lines of the air removal system are continually free from liquid fuel and the total cross section stands completely open and available for the through-flowing air therein.

The quantity of liquid fuel which accumulates itself in the air removal lines is small, to the extent that it amounts to only 20 to 30 ml/hr travel time of the vehicle. Accordingly, a source of suction, namely a suction apparatus, of reasonably low capacity suffices to keep the air removal lines free, in great part, from the presence of liquid fuel. To fulfill the purpose of suction sources, for example, ejector pumps can well be used in the tank system. These can be run by the electrical fuel pump which is already in the tank. Such ejector pumps are small, light and of low cost and are commercially available as standard components.

In present day motor vehicles there is often a plurality of ejection pumps available for various purposes. One or more of these pumps can be used, in order to provide suction. These existing pumps can, in a simple way, also contribute to generating suction for air removal lines. This saves the cost of extra components as well as the expense for a separate additional suction source.

Furthermore, external to the tanks, suction pumps are normally located and other suction sources are to be found in the vehicle. For an example of such existing suction sources, the entire tank system can be held under a negative pressure or a suction pump can be used for a central control system, or yet a suction is produced in the induction pipe of the motor. Such sources of reduced pressure as here named, can likewise be easily and economically put to use in an advantageous manner by the installation of a hose leading to the above mentioned suction opening. The fuel, which is so removed by suction, is then returned into the storage of the fuel tank.

A suction source can be installed directly on the air removal line, that is to say, more exactly, onto the connection piece. The suction opening is then coupled directly to the selected source of suction. A direct connection can be regarded as a unified and integral component, which, for example, would consist of the entire air removal line, the connection piece and the attached source of suction. This particular unified component can then be preassembled, so that the final assembly of the motor vehicle tanks is simplified and thus the total costs are reduced. Principally, the corresponding connection lines, for example, the integrated ejector pump, must be included along with the assembly of the tanks.

Especially if an available suction device already present in the tank is to be used, and it is in a location remote from the air removal line, then this can be connected to the suction opening via a special connection line. The connection piece can be increased in its cross-section, and, in this way form a deepened fuel collection point lower than that of the siphon. Again, in the bottom of this additional deep location, a suction opening can be made. The fuel, which has collected in a fuel collection chamber does not escape so easily, even during drive in curves and accordingly can react more quickly to the suction removal process.

The assembled invented component volume remains, in accord with the purpose of the invention, in all respects very small. Accordingly the tank interior space still stands nearly entirely available for the input of a full supply of fuel.

Within the air removal line, it is possible, in the connection piece itself, to place a float, which controls the suction source with dependence on the level of the fuel residing within the siphon. That is to say, upon a zero-demand, this is shut off and thus the pressure relationships in the air removal system are not disturbed.

In order to avoid an overflow of fuel from inside the tank, due to the suction source in the air release line, it is possible to install a check valve at an appropriate location, such as part of the source of suction itself or between this and the suction opening.

If the check valve possesses a seat for a sealing element, which peripherally encompasses the suction opening, and if valve has a thereto appropriate closing means, which can be opened by the suction, and the closing means is further subjected to the force of a reseating spring element, then, in a simple manner, one may be assured that no fuel material migrates into the air removal line from the interior of the tank, as long as the suction source is not operating even in the case of an upset vehicle.

When the check valve is closed, the pressure relationships in the tank and in the air removal system are such that the condition is as though there were no suction opening in the air removal system.

Alternatively, a float valve can be provided, which can seal off the suction opening in respect to the suction source. This float valve is opened by the accumulation of fuel in the siphon. The suction opening is thus only opened after a predetermined amount of collected fuel has collected in the siphon. In this way, the above mentioned pressure relationships remain unchanged until a necessity for suction-removal of fuel exists. An additional roll-over ball valve can be used in a simple manner by the installation of a ball based valve under the suction opening.

BRIEF DESCRIPTION OF THE DRAWINGS

For a further description of the invention, reference is made to the drawings showing embodiments of the invention. There is shown in.

DETAILED DESCRIPTION OF THE DRAWINGS

Figure 1:
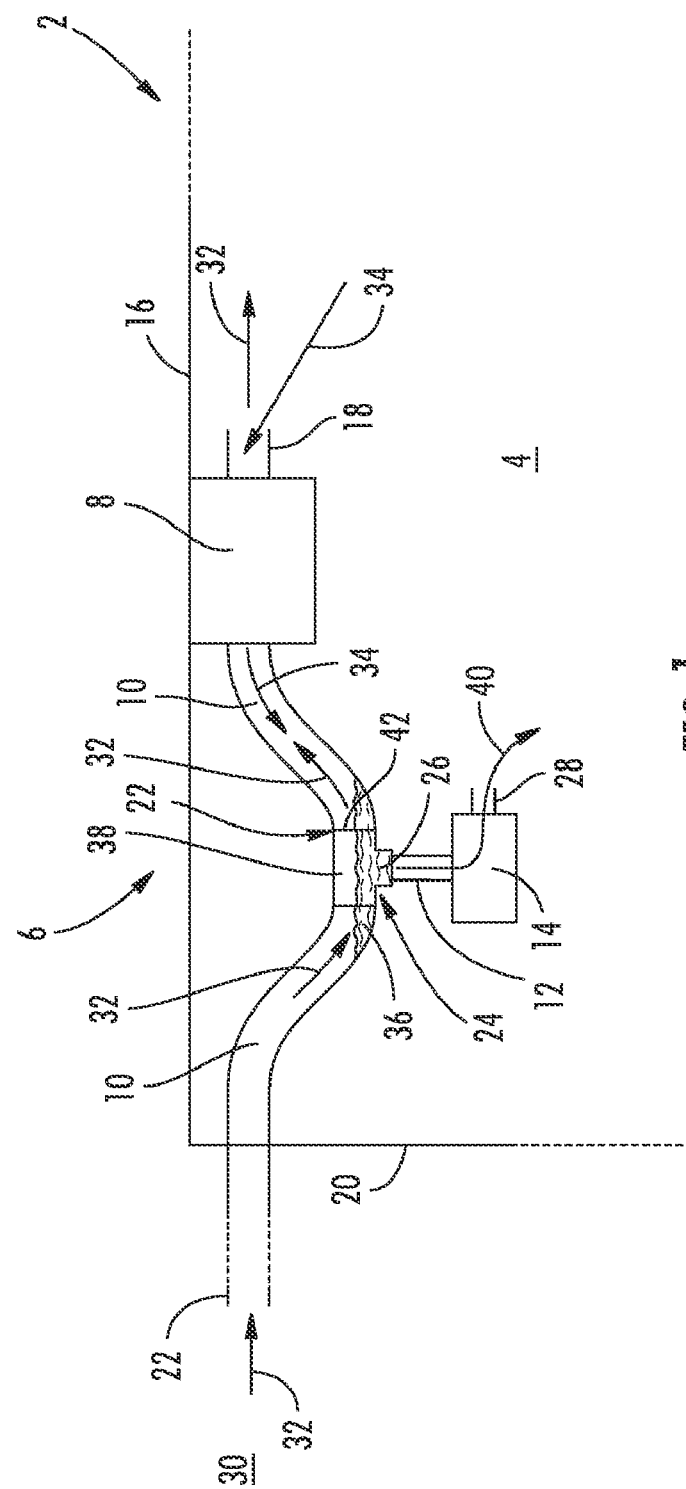
FIG. 1 a schematic presentation of a section of a motor vehicle fuel tank with an air vent system, having a siphon and a connection piece with an air release line with a suction opening.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

FIG. 1 shows a simplified section from a motor vehicle fuel tank 2. In the interior 4 of the tank 2, an air release system 6 is integrated.

The air release system 6 includes a level controlling valve 8 for limiting the "full" level, an air release line 10, a connection line 12 and a suction source or ejector pump 14.

The level controlling valve 8 possesses two openings and is securely affixed on the upper wall 16 of the tank. The opening 18 opens the level controlling valve 8 to the interior 4 of the tank. At the other opening of the level controlling valve 8, the air release line 10 is closed at its one end.

The air release line 10 is conducted through a side wall 20 of the vehicle tank 2 with proper sealing and is allowed to remain open on its other end 21, at which point the air release is open to the atmosphere, i.e., to the ambient surroundings 30. Here an activated carbon filter (not shown) should be placed.

Between the level controlling valve 8 and the passage through the side wall 20, the air release line 10 forms of itself a siphon 22, in other words, a "knee" or a "line bend". The siphon 22 is of such a nature, that it is bowed downward in the direction of gravitational liquid flow. At its deepest position 24 is placed a line connector 42, which has a suction opening 26 on its underside. At this suction opening 26, the connection line 12 is attached with appropriate sealing. This connection can be made also with welding. The connection line 12 leads from the suction opening 26 to the suction side of the suction source 14, thus to a suction intake. The outlet 28, that is, on the pressure side of the suction source 14, is likewise open to the tank interior 4.

During driving operation of the vehicle (not shown), fuel (not shown) is taken out of the interior 4 of the tank 2 and conveyed to the motor (not shown). Accordingly, resultant lower pressure in the air space of the tank interior 4 causes fresh air to flow through the air removal system 6 from the surrounding environment 30 in the direction of arrow 32 into the tank interior 4, whereupon atmospheric pressure is approximately restored.

In the case of, for example, a filled fuel tank 4, and during driving through curves or uneven road surfacing, it is possible that a small quantity of fuel can pass through the opening 18 and the level controlling valve 8 and proceed into the air removal line 10.

Due to the force of gravity, fuel 36 will accumulate at the deepest location of the siphon 22, as may be seen by the dotted line. Because of this accumulation of fuel 36, the effective cross-section 38 of the air removal line 10 is reduced, which cross-section should stand available for the inflow or outflow of air in the tank 2. In order to hold this reduction of the cross-section 38 to a minimum, or to increase its effective area, the fuel 36 is removed by suction through the connection line 12 and the suction source 14, thus moving the fuel 36 in the direction of the arrow 40 out of the siphon 22 and once again into the fuel tank interior 4 supply through the outlet 28. In this way, there remains in any operational situation of the motor vehicle only a minimal quantity, or even none at all, of fuel 36 in the siphon 22. The maximum residual fuel 36 is made clear and presented in FIG. 1 as an excessive level of fuel 36. The total cross-section 38 of the air removal line 10, in accord with the invention, remains available for aeration and deaeration of the vehicle tank 2.

Figure 2:
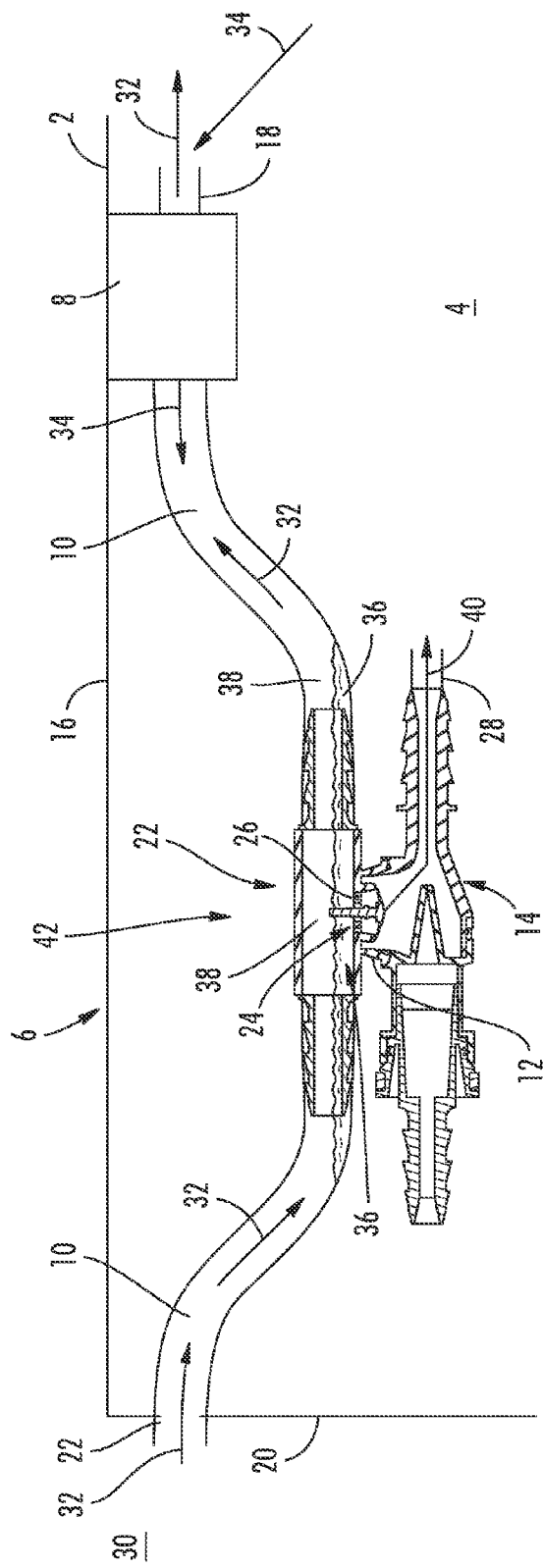
FIG. 2 a detailed drawing of the siphon of FIG. 1 with a separated air release line and a line connector for the suction opening.

FIG. 2 shows the siphon 22 of FIG. 1, along with the line connector 42 in a more detailed presentation. At the deepest part 24 of the bend, there is no hose section of the air removal line with a suction opening penetrating therethrough, and the line connector 42 is in place, which, so to say, enhances the air removal line 10. The ends of the hose sections, which are made by the separation of the air removal line 10, are connected with appropriate sealing means to the line connector 42. The deepest part 24 of the siphon 22 is thus formed by the line connector 42 on which account the suction opening 26 is integrated therein, and at that location, the connection line 12 and the suction source 14 are connected. An ejector pump, used as the source of suction 14, is given detailed explanation in FIGS. 2, 4. This pump 14 is directly connected to the line connector 42 approximately where the connection line 12 converts to a collar 64.

Figure 3:
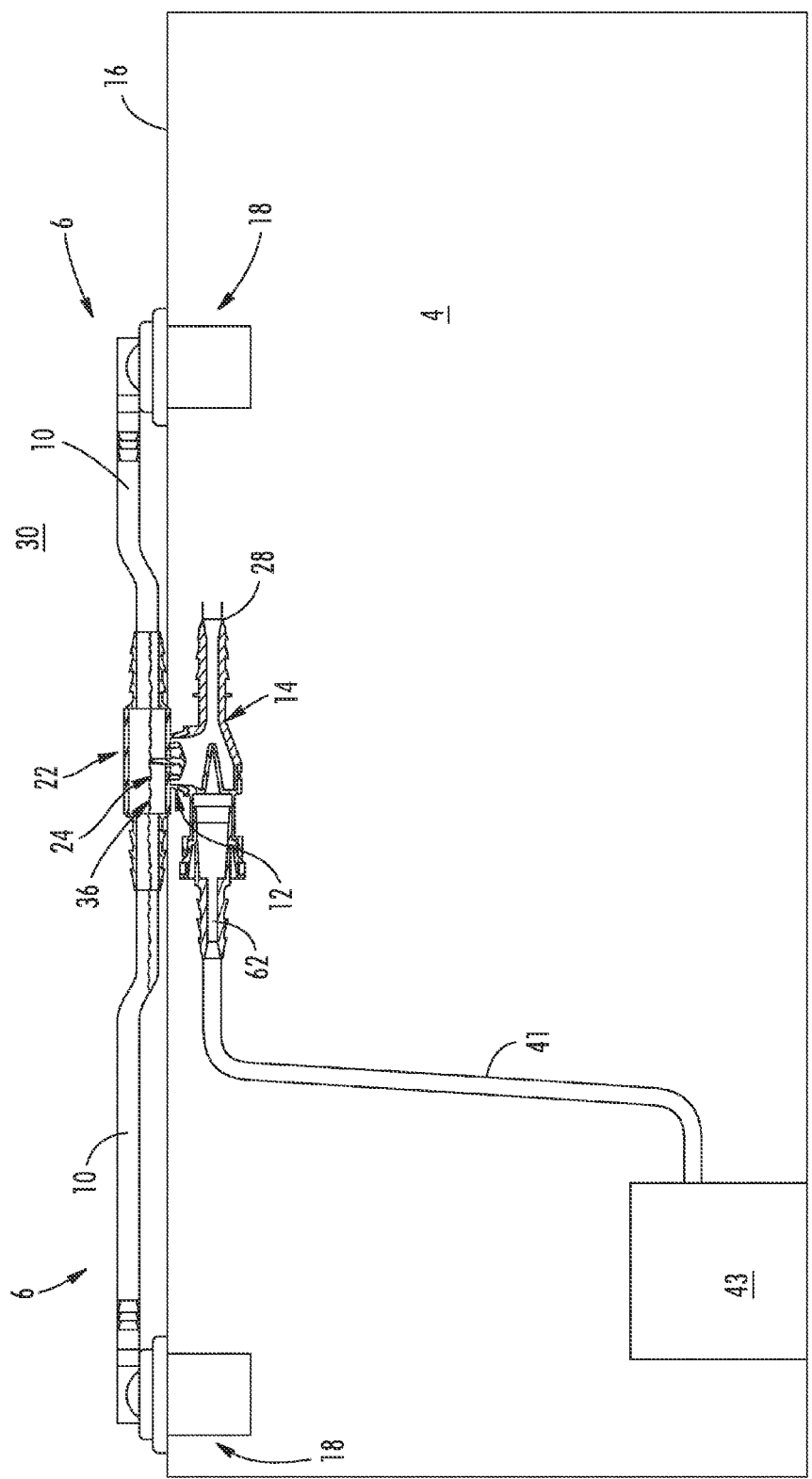
FIG. 3 an alternatively designed motor vehicle fuel tank with an air release system and fuel intake suction device located externally on the tank.

FIG. 3 shows an alternate embodiment for a vehicle tank 2 with an air removal system 6 located in the ambient environment 30 outside of the tank 2. The line connector 42 is thus to be found externally from the tank 2 into which the connecting line 12 penetrates, with appropriate sealing means, via the upper tank wall 16. On this account, the ejector pump 14 continues to be located in the interior 4 of the tank 2. Inside the tank 2, no additional support means for the line connector 42 or the ejector pump is 14 required. Both components are fastened to the tank wall 16. Further in FIG. 3, are valves (not further described) on both ends of the air removal line 10. These valves have available openings 18 into the tank interior 4, through which openings 18 the fuel can enter into the air removal line 10. The end 21 of the air removal line 10, which opens to the surroundings, is not shown in FIG. 3. However, what is illustrated is fuel pump 43, connected to the ejector pump 14 by a connecting line 41, which is mounted on feed fittings 62.

Figure 4:
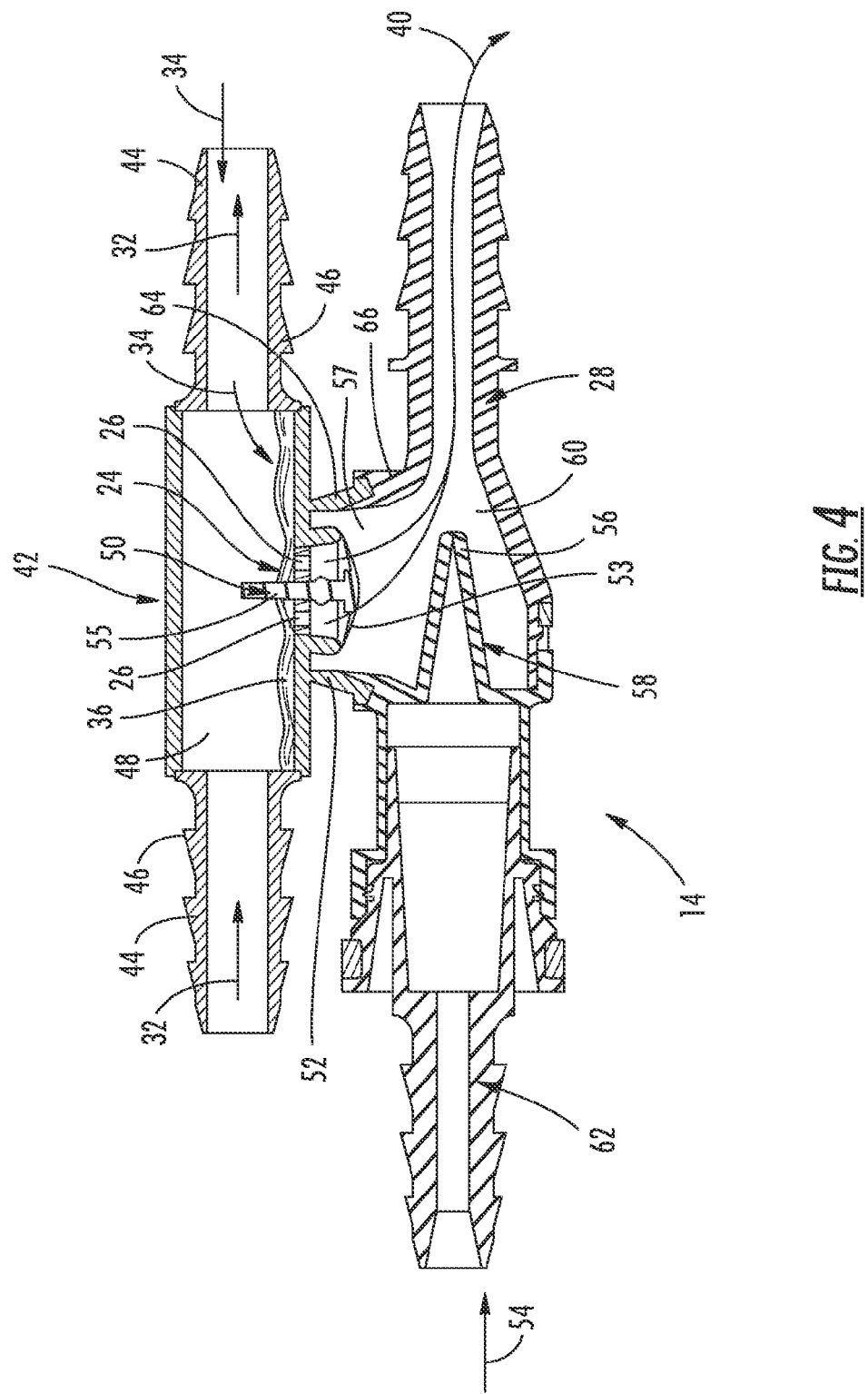
FIG. 4 a sectional view of the line connector of FIGS. 2, 3 with an integrated ejector pump with an elastomer valve.

FIG. 4 shows the line connector 42, as shown in FIGS. 2, 3, where it was depicted as directly connected as suction source 14 onto the ejector pump with which it forms a single, integrally combined component.

Where the ejector pump is concerned, this is a conventional suction pump with a common nozzle 56 and a known method of operation. In this pump, fuel is injected under pressure in the direction of the arrow 54. The pressure is made by an electrical fuel pump (not shown) within the fuel tank 2. Due to the high speed outflow of fuel at the tip 56 of the nozzle 58 into the chamber 60, a suction is generated in the chamber 60. The fuel pulled into the chamber 60 by the suction is expelled outward through the outlet 28. The tapered feed fittings 62 and the fitting at outlet 28 of the ejector pump are equipped with hose-holding annular ridges, in order to provide assured connection for the intake and outlet hoses (not shown).

A more detailed description of the ejector pump need not be given here, since this is only included in the figures as an example.

The fittings 44 on the line connector 42 are made with the expectation of a long-time connection of the attached air removal line 10 as shown in FIG. 2, and these likewise are provided with holding-barbs 46 on their outer circumferences. In between the two fittings 44, in the middle of the line connector 42 is formed a chamber 48, which exhibits approximately the same inner cross-section as the air removal line 10. The already described accumulation of remnant fuel 36 collects in this chamber 48, which chamber 48 is now located at the deepest part of the air removal line 10. In the midsection of the underpart of the chamber 48 are made available a plurality of annularly placed suction openings 26, through which the fuel 36 may be removed by suction.

The suction openings 26 can be closed by an elastomer valve 50 mounted externally on the air removal line 42. This valve 50 can be a mushroom valve, a membrane valve or the like. The elastomer valve 50, shown here in the form of a mushroom valve, is formed by first, a collar 52 serving as a valve seat, which has been molded on the underside of the line connector 42 and second, a mushroom shaped membrane 53, which bulges, appropriately in mushroom shape, downward. The outer circumferential rim of the bulged membrane 53 acts as a sealing closure against the collar 52. The membrane 53 lies in that position indicated by FIG. 3, whereby it is positioned within a collar 52 and thus closes the suction opening 26. The membrane 53 is held upon its guide pin 55 in the direction of the arrow 40 and is axially displaceable from the sealing seat, in order to make free the suction opening 26.

Concentric to the collar 52 is another collar 64 of greater diameter, which is molded on the line connector 42. This greater collar serves for the mechanical fastening of the ejector pump on the line connector 42. In this case, a complementary piece 66 is molded onto ejection pump which provides a joint with the collar 52. The matching piece 66 may be welded or adhesively attached to the collar 52. The collar 52, that is to say, the corresponding projection of the ejector pump encompasses a connection chamber 57, which is a continuation of the chamber 60 and corresponds to the connection line 12 of FIGS. 1, 2, and brings the ejection pump into connection with the suction openings 26.

The elastomer valve 50 prevents fuel from migrating in a direction counter to the arrow 40 through the suction pump into the chamber 48 of the line connector 42 and further, via the air removal line 10, prevents fuel from releasing into the surrounding environment 30. In a case of a pressure in the connection chamber 57, which is greater than the pressure in the chamber 48, the elastomer valve 50 would close. This valve 50 only opens when it is displaced downward from its valve seat 52 because of the suction produced by the ejection pump in the chamber 57 in relation to the pressure in the chamber 48, which differential then acts upon the elastomer valve 50 through the described suction openings 26. In the direction of the arrow 40 the elastomer valve 50 permits also the suction removal of fuel 36 from the chamber 48.

The fuel 36 carried in suction flow moves in the direction of the arrow 40 via the fittings 28 and thus out of the chamber 48.

Figure 5:
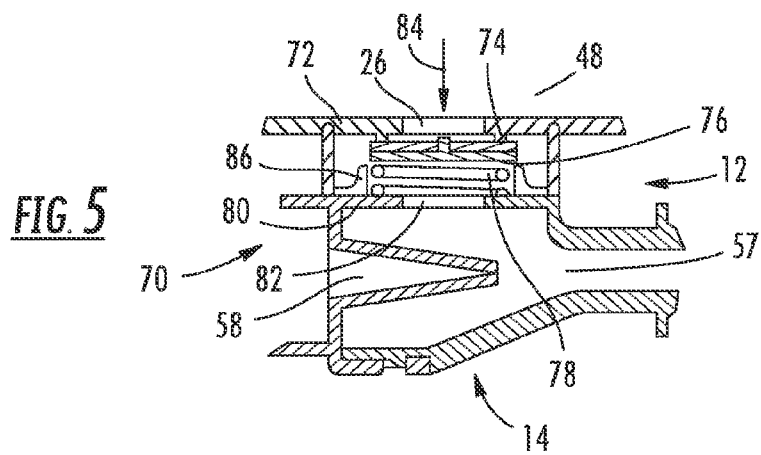
FIG. 5 a section from a suction apparatus of FIG. 4 with a spring activated check valve.

FIG. 5 shows that section, which includes the elastomer valve 50 of the arrangement shown in FIG. 4 with an alternatively arranged check, or backflow blocking valve 70. This check valve 70 is placed in the connection line 12. It encompasses a sealing seat 74, which is molded onto the wall 72 of the chamber 48 and which circumferentially encompasses the suction opening 26, on which a sealing element is placed. The sealing element 76 is forced against the sealing seat 74 via a helical spring 78, which spring, with one end on the sealing element 76 and its other end abutting the wall 80 of the suction source 14. In order to create a connection for the passage of suction transported fuel between the connection chambers 57 and 58, the wall 80 is provided with an opening 82.

FIG. 5 particularly shows a condition in which the suction source 14 is not in operation. The sealing element 76 thus shuts off the suction opening 26 and fuel cannot move out of the chamber 57 into the chamber 48. Simultaneously, neither can any air flow through the suction opening 26, so that the pressure relationships in the vehicle tank 2 and in the air removal system 6 remains unchanged, as compared to conventional air removal systems without the equivalence of the said suction opening 26.

If the suction source 14 is placed in operation, then there is created in the chamber 57 a suction in reference to the chamber 48 whereby the sealing element 76 is lifted away from the sealing seat 74 against the force of the helical spring 78 and in the direction of the arrow 84. With this action, fuel can be transported by suction out of the chamber 48 into he connection chamber 57. For the guidance of the sealing element 76 in the raised position away from the sealing seat 74, in the connection line 12 is provided a concentric guide 86, which is, in the direction 84, concentric to the sealing element 86.

Figure 6:
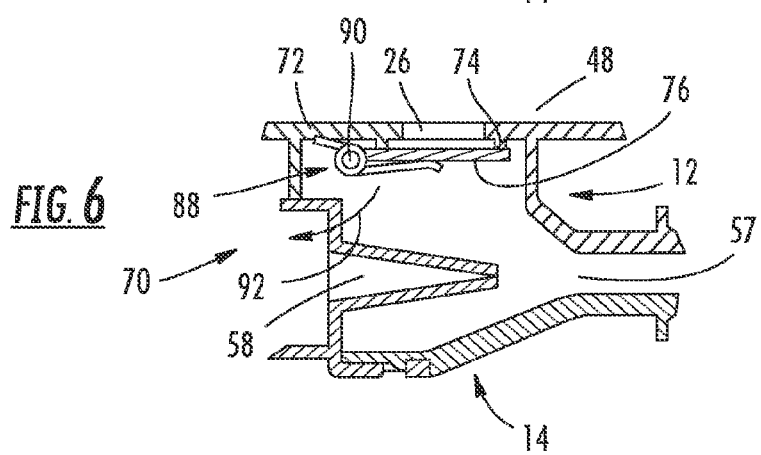
FIG. 6 a section from the suction apparatus of FIG. 4 with a flap valve.

FIG. 6 shows an alternative embodiment of a check valve 70. In this aspect of the invention, the sealing element 76 is forced against the sealing seat 74 via a torsion coiled spring 88. In this case, the torsion coiled spring 88 supports itself on a turnable axle 90 with one of its ends on the wall 72 and the other on the sealing element 76. The rotating axle 90 is, at the same time, the turn axis for the sealing element 76, which can be operated in the manner of a hinged flap or a door. Similar to FIG. 5, the example of FIG. 6 shows a situation in which the suction source 14 is inoperative. Upon the switching in of the suction source 14, the sealing element 76 swings in the direction of the arrow 92 about the rotational axle 90 and frees the suction opening for flow.

Figure 7:
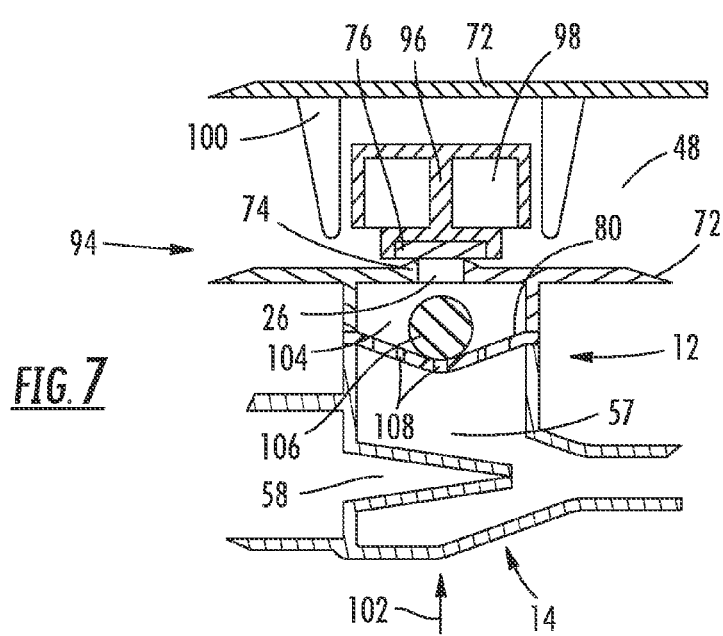
FIG. 7 a section from the suction apparatus of FIG. 4 with a float valve and a ball type check valve.

FIG. 7 shows a further embodiment similar to the arrangement of FIG. 4 in which the elastomer valve 50 is replaced by a float valve 94. The sealing seat 74 is, in this case, placed on that side of the wall 72, which is proximal to the chamber 48. The float body 96, with its air space 98 and the thereon fastened sealing element 76, is guided into the chamber 48 by a direction means 100 in the direction of the arrow 102. In the presentation of FIG. 7, the suction opening 26 is closed, since no fuel has accumulated within the chamber 48 and the float 96 is being subjected to no driving force. Additionally, in the case of an activated suction source 14, the float is held on the sealing seat 74 via the differential pressure between the chambers 57 and 48. If, in the chamber 48, the level of fuel increases, then the float 96, receives a driving actuation via the air chamber 98 and then moves counter to the opposing force of gravity and likewise mentioned suction force in the direction of the arrow 102. When this occurs, the sealing element 76 departs from the sealing seat 74 and the suction opening 26 is free. The inner diameter of the chamber 8 is so dimensioned that the available cross-section for the air flowing through for the air removal system 6, even considering the presence of a voluminous float 96, is large enough so that no additional resistance to flow is generated in the air removal system 6.

In comparison to the other embodiments shown in the depicted examples, the suction opening 26 in FIG. 7, remains closed, even during the operation of the ejection pump until no, or at least a small quantity of fuel remains in the accumulation chamber 48. The pressure relationships in the entire air removal system 6 are on this account unchanged in comparison to an assembly without a suction opening 26. The suction of fuel from the air removal system 6 is done only in the case of the presence of a nominal quantity of fuel in the chamber 48.

Also in the embodiment of FIG. 7, a chamber 104 is provided in the connection line 12, which incorporates a ball-type check valve 106. During in normal operation of the vehicle tank 2, the valve 106 has no functionality due to an opening 108 in the wall 80 by the valve 106, i.e., the suction transport of fuel out of the chamber 48 to the chamber 57 is not prevented by the valve 106. Only in a case of an inversion of the vehicle tank 2 does the roll-over ball 106 block the opening 26 from the side of the chamber 104 and thus prevent fuel from flowing out of the chamber 57 into the chamber 48 and escaping from the vehicle tank 2.

While preferred embodiments have been shown and described, those skilled in the art will recognize that changes and modifications may be made to the foregoing examples without departing from the scope and spirit of the invention. For example, specific shapes and dimensions of various elements of the illustrated embodiments and materials used for those elements may be altered to suit particular applications and industry regulations. It is thus intended to claim all such changes and modifications as fall within the scope of the appended claims and their equivalents.

Moreover, references herein to "top," "bottom," "over," "under," "outer" and "inner" structures, elements, and geometries and the like are intended solely for purposes of providing an enabling disclosure and in no way suggest limitations regarding operative orientation of the invention or equivalents thereof.

The invention claimed is:

1. A fuel tank with an air removal system, the air removal system comprising:
    an air removal line connecting an interior space of the tank with an ambient environment, the removal line forming a siphon at a deepest location of the air removal line and defining a separation through the siphon;
    a connection piece having four ports, a first and a second of the ports attached to and inserted within the air removal line at the separation, the connection piece defining a fuel accumulation chamber between the first and second ports, a suction chamber between a third and a fourth of the ports, and a suction opening between the fuel accumulation chamber and the suction chamber;
    a one-way valve mounted at the suction opening in a closed position and movable to an open position; and
    a suction source within the suction chamber, the suction source created by flow of fuel from the fuel tank into the third port, through the suction chamber and out the fourth port to thereby apply suction to the air removal line from the suction chamber via moving the one-way valve to the open position, thereby opening the suction opening and removing fuel from the fuel accumulation chamber via the suction opening, the suction chamber, and the fourth port.

2. A fuel tank in accord with claim 1, wherein the suction source is an eductor-jet pump.

3. A fuel tank in accord with claim 2, wherein the eductor-jet pump is disposed within the tank.

4. A fuel tank in accord with claim 1, further comprising a float disposed in the siphon, the float configured to control the suction source.

5. A fuel tank in accord with claim 1, further comprising a check valve configured for closure of the suction opening in a direction of the suction source.

6. A fuel tank in accord with claim 5, wherein the check valve encompasses a sealing seat facing the suction source and encircling the suction opening and a sealing element, the sealing element subjected to a spring element against the sealing seat, the sealing element hingedly liftable by a force of the suction source.

7. The fuel tank of claim 1, further including a fuel pump and a fuel line, the fuel line connecting the fuel pump and the third port, whereby the fuel pump pumps fuel into the third port via the fuel line to create suction in the suction chamber.

* * * * *